United States Patent
Mahnad et al.

(10) Patent No.: US 7,139,152 B2
(45) Date of Patent: Nov. 21, 2006

(54) SERVO METHODS AND SYSTEMS USING EXISTING DATA STRUCTURES AND OPTICAL MASKS

(75) Inventors: Faramarz Mahnad, Waltham, MA (US); George A. Saliba, Northborough, MA (US); Leo Cappabianca, Worcester, MA (US); Mitchell R. Steinberg, Upton, MA (US)

(73) Assignee: Quantum Corporation, San Jose, CA (US)

( * ) Notice: Subject to any disclaimer, the term of this patent is extended or adjusted under 35 U.S.C. 154(b) by 0 days.

(21) Appl. No.: 10/929,039

(22) Filed: Aug. 27, 2004

(65) Prior Publication Data

US 2005/0083601 A1    Apr. 21, 2005

Related U.S. Application Data

(60) Provisional application No. 60/513,155, filed on Oct. 20, 2003.

(51) Int. Cl.
*G11B 5/584* (2006.01)
(52) U.S. Cl. .................. 360/77.12; 360/77.03
(58) Field of Classification Search ............ 360/77.12, 360/77.03; 369/109, 44, 174
See application file for complete search history.

(56) References Cited

U.S. PATENT DOCUMENTS

| | | | |
|---|---|---|---|
| 2,937,239 A | 5/1960 | Walker et al. | |
| 3,633,038 A * | 1/1972 | Falk | 250/201.1 |
| 3,829,895 A | 8/1974 | Tanaka et al. | |
| 3,919,697 A | 11/1975 | Walker | |
| 3,971,002 A | 7/1976 | Bricot et al. | |
| 4,056,830 A | 11/1977 | Smith | |
| 4,110,799 A | 8/1978 | Bergmans et al. | |
| 4,149,204 A | 4/1979 | Marino et al. | |
| 4,176,381 A | 11/1979 | de Niet et al. | |
| 4,321,634 A | 3/1982 | Lehureau | |
| 4,334,252 A | 6/1982 | Toriu | |
| 4,392,163 A | 7/1983 | Rijkaert et al. | |
| 4,422,112 A | 12/1983 | Tanaka | |
| 4,424,541 A | 1/1984 | Koinuma et al. | |
| 4,439,793 A | 3/1984 | Nater | |
| 4,449,082 A | 5/1984 | Webster | |
| 4,472,750 A | 9/1984 | Klumpp et al. | |

(Continued)

FOREIGN PATENT DOCUMENTS

EP    0 854 471 A1    7/1998

(Continued)

OTHER PUBLICATIONS

European Search Report mailed on Mar. 4, 2005 for EP patent application No. 04256390.8, 3 pages.

*Primary Examiner*—K. Wong
(74) *Attorney, Agent, or Firm*—Morrison & Foerster LLP

(57) ABSTRACT

In one example, a method is provided for detecting the relative position of a transducer head with respect to a storage medium utilizing existing or previously written data structures on a magnetic storage tape and optically diffractive media. The method includes generating a read signal from a read element associated with a transducer head, the read signal generated from a reference data track stored on a magnetic storage medium, and determining a relative position of a first diffractive medium with respect to a second diffractive medium, wherein the first diffractive medium is associated with the storage medium. The transducer head is repositioned relative to the storage medium in response to the read signal and the relative position of the first diffractive medium and the second diffractive medium.

28 Claims, 13 Drawing Sheets

U.S. PATENT DOCUMENTS

| | | |
|---|---|---|
| 4,479,156 A | 10/1984 | Kumagai et al. |
| 4,502,082 A | 2/1985 | Ragle et al. |
| 4,539,615 A | 9/1985 | Arai et al. |
| 4,679,104 A | 7/1987 | Dahlerud |
| 4,685,005 A | 8/1987 | Fields, Jr. |
| 4,802,030 A | 1/1989 | Henry et al. |
| 4,816,939 A * | 3/1989 | Ford et al. ............... 360/77.03 |
| 4,866,548 A | 9/1989 | Rudi |
| 4,975,791 A | 12/1990 | Eggebeen |
| 4,979,051 A | 12/1990 | Eggebeen |
| 5,050,017 A | 9/1991 | Carr et al. |
| 5,055,959 A | 10/1991 | Saliba |
| 5,072,319 A | 12/1991 | Kohri et al. |
| 5,121,270 A | 6/1992 | Alcudia et al. |
| 5,126,895 A | 6/1992 | Yasuda et al. |
| 5,132,861 A | 7/1992 | Behr et al. |
| 5,257,148 A | 10/1993 | Solhjell et al. |
| 5,262,908 A | 11/1993 | Iwamatsu et al. |
| 5,285,331 A | 2/1994 | White |
| 5,289,328 A | 2/1994 | Saliba |
| 5,294,791 A * | 3/1994 | Pahr ........................... 250/548 |
| 5,294,803 A * | 3/1994 | Pahr ........................ 250/559.36 |
| 5,371,638 A | 12/1994 | Saliba |
| 5,426,551 A | 6/1995 | Saliba |
| 5,448,430 A | 9/1995 | Bailey et al. |
| 5,452,152 A | 9/1995 | Rudi |
| 5,488,519 A | 1/1996 | Ishida et al. |
| 5,523,904 A | 6/1996 | Saliba |
| 5,563,868 A * | 10/1996 | Farnsworth et al. ..... 369/44.23 |
| 5,588,007 A | 12/1996 | Ma |
| 5,600,500 A | 2/1997 | Madsen et al. |
| 5,600,505 A | 2/1997 | Ayres |
| 5,617,269 A | 4/1997 | Gordenker et al. |
| 5,757,575 A | 5/1998 | Hallamesek et al. |
| 5,796,537 A | 8/1998 | Goker et al. |
| 5,815,337 A | 9/1998 | Milo |
| 5,844,814 A * | 12/1998 | Chliwnyj et al. ............. 700/30 |
| 5,847,892 A | 12/1998 | Goker |
| 5,862,014 A | 1/1999 | Nute |
| 5,940,238 A | 8/1999 | Nayak et al. |
| 5,949,604 A | 9/1999 | Saliba |
| 5,973,872 A | 10/1999 | Saliba |
| 5,973,874 A | 10/1999 | Panish et al. |
| 5,978,188 A | 11/1999 | Kaaden et al. |
| 5,982,711 A | 11/1999 | Knowles et al. |
| 6,005,737 A | 12/1999 | Connolly et al. |
| 6,018,434 A | 1/2000 | Saliba |
| 6,061,199 A | 5/2000 | Goker et al. |
| 6,075,678 A | 6/2000 | Saliba |
| 6,084,740 A | 7/2000 | Leonhardt et al. |
| 6,088,184 A | 7/2000 | Hu |
| 6,108,159 A | 8/2000 | Nute et al. |
| 6,118,605 A | 9/2000 | Call et al. |
| 6,128,155 A * | 10/2000 | Sugawara et al. ........ 360/78.11 |
| 6,130,792 A | 10/2000 | Goker |
| 6,134,072 A | 10/2000 | Zweighaft |
| 6,141,174 A | 10/2000 | Judge et al. |
| 6,188,532 B1 | 2/2001 | Albrecht et al. |
| 6,222,698 B1 | 4/2001 | Barndt et al. |
| 6,236,529 B1 | 5/2001 | Leonhardt et al. |
| 6,246,535 B1 * | 6/2001 | Saliba et al. .............. 360/77.12 |
| 6,275,349 B1 | 8/2001 | Smith |
| 6,275,350 B1 | 8/2001 | Barndt |
| 6,285,519 B1 | 9/2001 | Goker |
| 6,307,718 B1 | 10/2001 | Kasetty |
| 6,331,920 B1 | 12/2001 | Albrecht et al. |
| 6,339,522 B1 | 1/2002 | Hoelsaeter |
| 6,366,422 B1 | 4/2002 | Daniel et al. |
| 6,433,951 B1 * | 8/2002 | Lubratt ..................... 360/77.12 |
| 6,493,174 B1 | 12/2002 | Stubbs |
| 6,768,608 B1 | 12/2002 | Saliba et al. |
| 6,512,651 B1 | 1/2003 | Eifert et al. |
| 6,545,837 B1 | 4/2003 | Tran |
| 6,570,731 B1 | 5/2003 | Burke et al. |
| 6,700,729 B1 | 3/2004 | Beck et al. |
| 6,775,092 B1 | 8/2004 | Zweighaft et al. |
| 6,801,383 B1 | 10/2004 | Zweighaft et al. |
| 6,839,196 B1 | 1/2005 | Trivedi |
| 2002/0021524 A1 | 2/2002 | Saliba et al. |
| 2002/0176200 A1 | 11/2002 | Trivedi |
| 2003/0043498 A1 | 3/2003 | Johnson et al. |
| 2004/0042115 A1 | 3/2004 | Saliba et al. |
| 2005/0083600 A1 | 4/2005 | Mahnad et al. |
| 2005/0083602 A1 | 4/2005 | Saliba et al. |
| 2005/0088770 A1 | 4/2005 | Saliba et al. |
| 2005/0088776 A1 | 4/2005 | Saliba et al. |
| 2005/0094308 A1 | 5/2005 | Mahnad et al. |

FOREIGN PATENT DOCUMENTS

| | | |
|---|---|---|
| EP | 0 854 471 B1 | 7/1998 |
| EP | 0 919 990 A2 | 6/1999 |
| EP | 0 919 990 A3 | 6/1999 |
| EP | 0 996 127 A2 | 4/2000 |
| EP | 0 996 127 A3 | 4/2000 |
| EP | 0 996 127 B1 | 4/2000 |
| JP | 59-185020 A | 10/1984 |

* cited by examiner

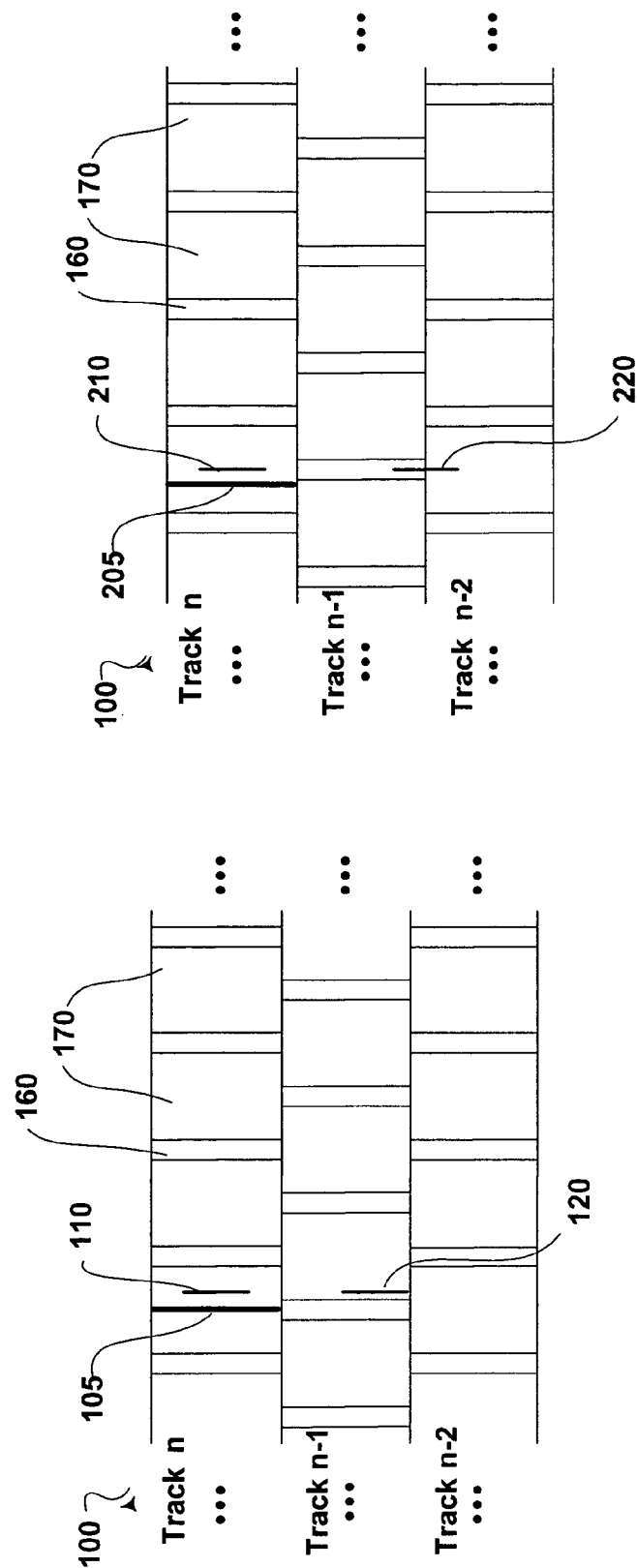

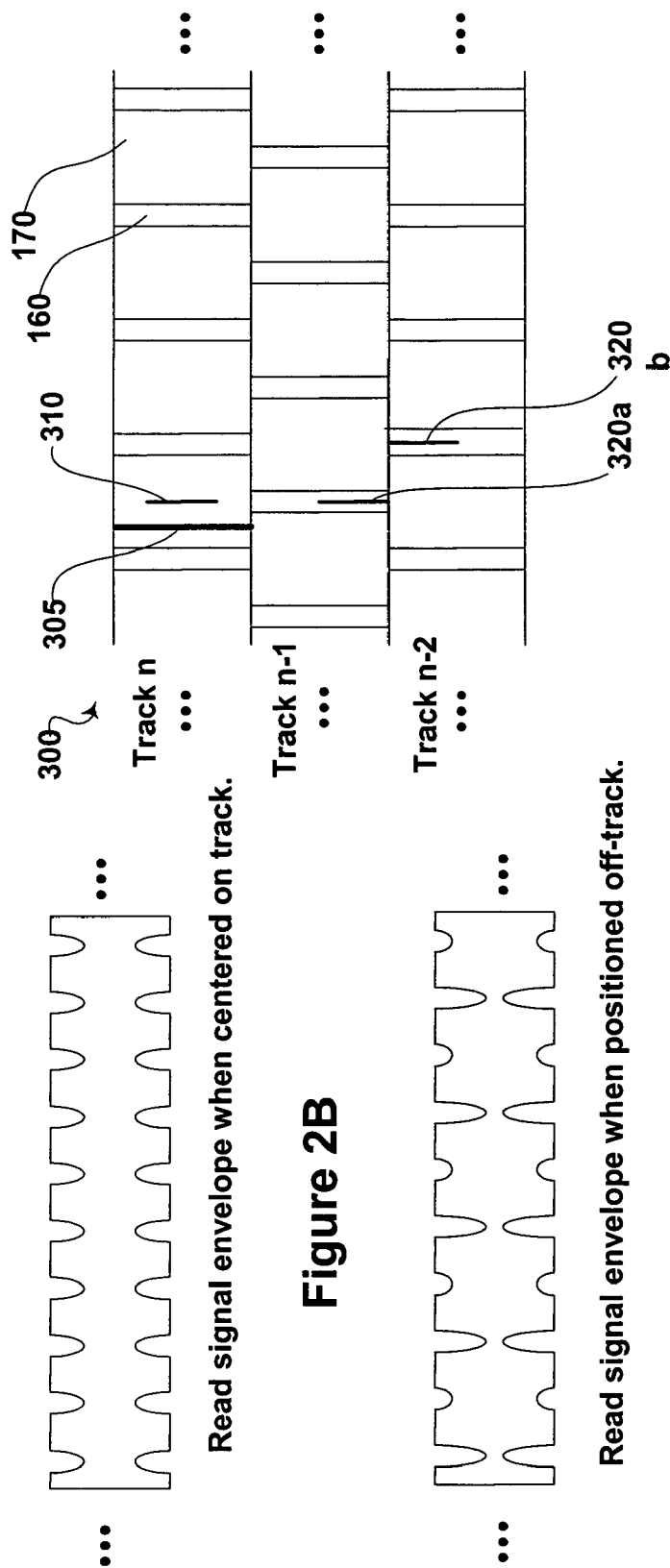

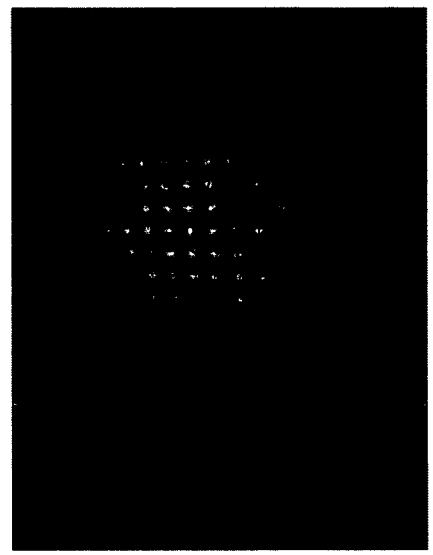
Figure 16 (HiNe laser)
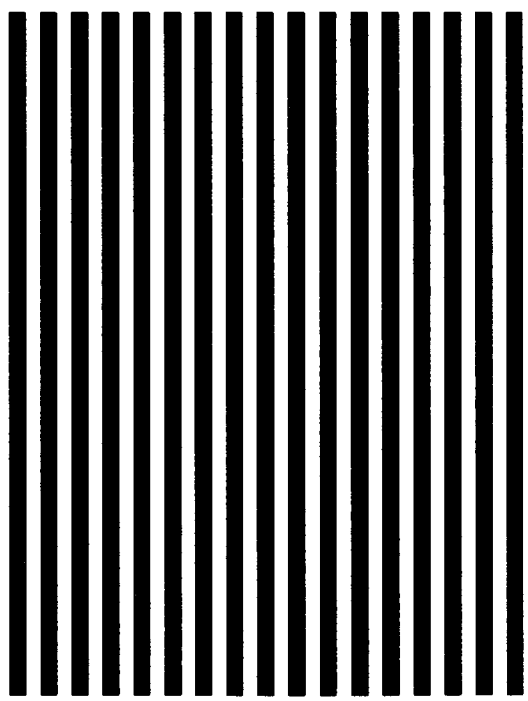
Figure 15

Tape Edge with Mask, Edge Motion Vertically Over Mask, 17 track crossing are detected

SERVO METHODS AND SYSTEMS USING EXISTING DATA STRUCTURES AND OPTICAL MASKS

CROSS REFERENCE TO RELATED APPLICATION

The present application claims benefit of earlier filed provisional patent application, U.S. application Ser. No. 60/513,155, filed on Oct. 20, 2003, and entitled "SERVO METHODS AND SYSTEMS FOR MAGNETIC RECORDING AND READING," which is hereby incorporated by reference as if fully set forth herein.

BACKGROUND

1. Field of the Invention

The invention relates generally to magnetic tape storage devices and systems, and more particularly to methods and systems for head positioning servo systems for detecting misalignment between a read/write head and a magnetic storage tape.

2. Description of the Related Art

Digital tape-recording remains a viable solution for storage of large amounts of data. Conventionally, at least two approaches are employed for recording digital information onto magnetic recording tape. One approach calls for moving a magnetic tape past a rotating head structure that reads and writes user information from discontinuous transverse tracks. Interactive servo systems are typically employed to synchronize rotation of the head structure with travel of the tape. Another approach is to draw the tape across a non-rotating head at a considerable linear velocity. This approach is sometimes referred to as linear "streaming" tape recording and playback.

Increased data storage capacity, and retrieval performance, is desired of all commercially viable mass storage devices and media. In the case of linear tape recording a popular trend is toward multi-head, multi-channel fixed head structures with narrowed recording gaps and data track widths so that many linear data tracks may be achieved on a tape medium of a predetermined width, such as one-half inch width tape. To increase the storage density for a given cartridge size the bits on the tape may be written to smaller areas and on a plurality of parallel longitudinal tracks. As more data tracks are recorded on a tape, each track becomes increasingly narrow. The tape therefore becomes more susceptible to errors caused from the tape shifting up or down (called lateral tape motion or "LTM") in a direction perpendicular to the tape travel path as the tape passes by the magnetic head. LTM may be caused by many factors including, tape slitting variations, tension variations, imperfections in the guiding mechanism, friction variations mainly at the head, and environmental factors such as heat and humidity. These factors affect LTM in various ways. Some may cause abrupt momentary jumps while others may cause a static shift. Generally, LTM is unpredictable and unrepeatable.

In multi-head, multi-channel magnetic tape storage systems, random lateral tape motion is generally a limiting factor in achieving higher track densities and thus higher user data capacity per tape. In order to maintain proper alignment of the head with the storage tape and data tracks on the tape, the tape is generally mechanically constrained to minimize LTM and data retrieval errors. Miss-registration between the head and data tracks can cause data errors during readback and data loss on adjacent tracks during writing.

Various techniques for increasing the track density on magnetic tape employ recording servo information on the tape to provide positioning information to a tape drive system during writing and/or reading processes. Some systems magnetically record a continuous track of servo information which is then read and used as a position reference signal. For example, a variety of techniques have been used including dedicated and embedded magnetic servo tracks, time and amplitude magnetic servo tracks, and the like. Other systems may intersperse or embed servo information with user data. These examples, however, reduce data capacity of the tape by using a portion of the tape capacity for servo information.

BRIEF SUMMARY

According to one aspect of the present invention magnetic and optical servo systems and accompanying methods are provided for acquiring relative position information of a read/write head to a storage tape utilizing existing or previously written data structures on a magnetic storage tape and optically diffractive media.

In one example, a method is provided for detecting the position of a transducer head with respect to a storage medium. The method includes sensing a read signal from a read element associated with a transducer head, the read signal in response to a reference data track stored on a magnetic storage medium, and determining a relative position of a first diffractive medium with respect to a second diffractive medium, wherein the first diffractive medium is associated with the storage medium. The transducer head is repositioned relative to the storage medium in response to the read signal and the relative position of the first diffractive medium and the second diffractive medium.

The reference track may include one or more previously written data tracks, and the transducer head may be repositioned based on one or more characteristics of the read signal that vary as a function of offset between the reference track and the read element. Additionally, the first diffractive medium may be included with the storage medium or include an edge of the storage medium.

In another example, a head positioning servo system is provided. The exemplary system includes a transducer head assembly including a magnetic read element, a diffractive medium spatially fixed with respect to the transducer head assembly, a light source for illuminating at least a portion of a magnetic storage medium and the diffractive medium, a detector for detecting light from the light source illuminating the magnetic storage medium and the diffraction medium, and a controller configured to adjust the position of the transducer head based on the detected light and a read signal from the read element associated with a reference data track stored on a magnetic storage medium.

The servo systems and methods described herein may be employed in a tape drive system to calibrate or servo a recording head with respect to a recording tape. A suitable controller may determine the relative position of the head to the tape, thereby allowing the controller to adjust the head position to achieve a desired position with respect to the tape.

The present invention and its various embodiments are better understood upon consideration of the detailed description below in conjunction with the accompanying drawings and claims.

BRIEF DESCRIPTION OF DRAWINGS

FIG. 1 illustrates a read element relative to data tracks on a storage medium in an exemplary read process;

FIG. 2A illustrates a read element relative to data tracks on a storage medium in an exemplary read process;

FIGS. 2B and 2C illustrate exemplary read signals generated from adjacent data tracks;

FIG. 3 illustrates two read elements relative to data tracks on a storage medium in an exemplary read process;

FIG. 15 illustrates an exemplary pattern of an object and/or reference mask;

FIG. 16 illustrates an exemplary optical mask diffraction pattern;

DETAILED DESCRIPTION

Figure 4:
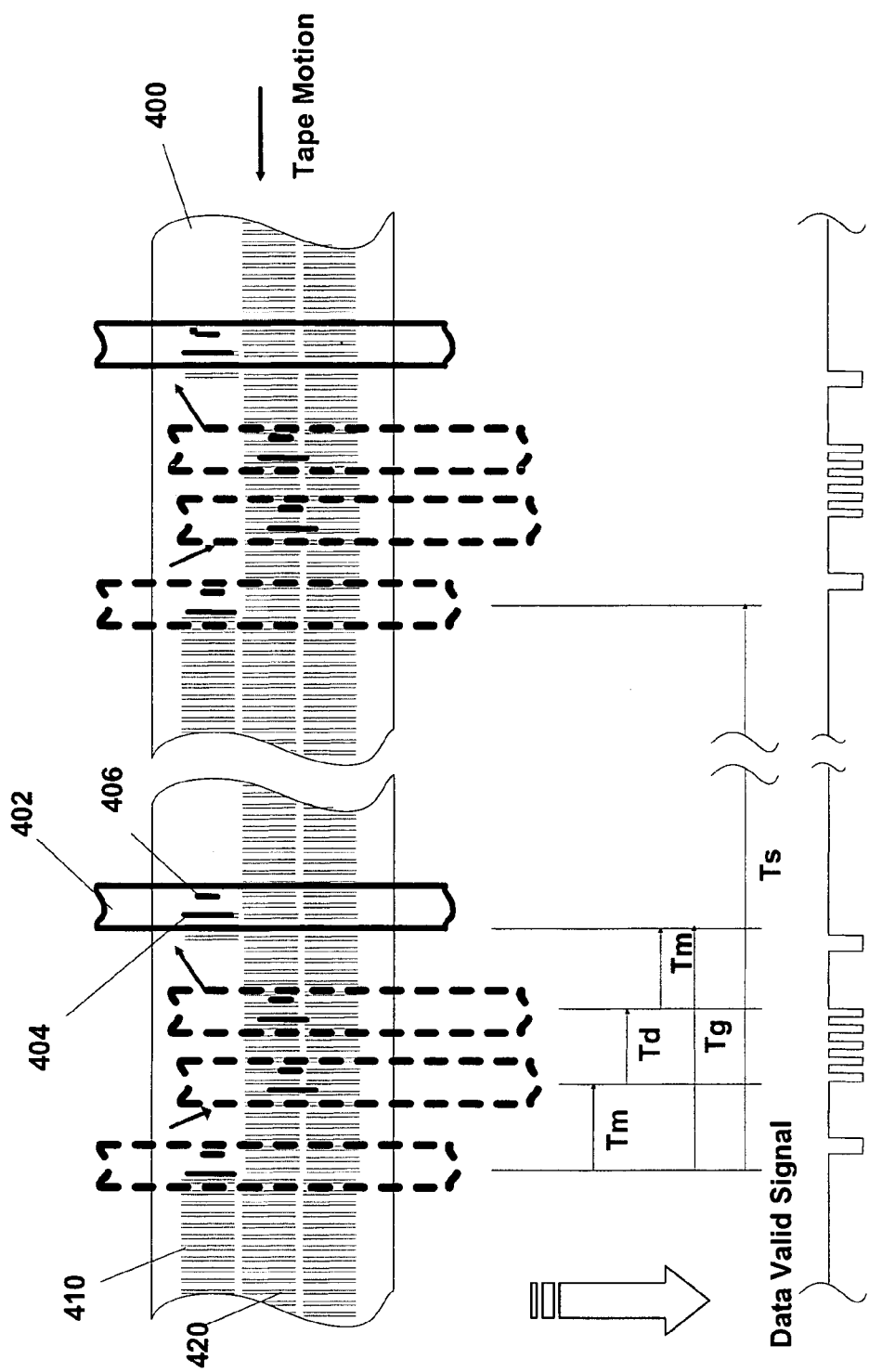
FIG. 4 illustrates an exemplary magnetic head assembly relative to a magnetic tape and associated signals generated during a servo process.

Various methods and systems for providing calibration and/or position information for a servo system, e.g., a primary servo system or subsystem servo system, are provided. The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

Accurately positioning a transducer head with respect to a magnetic storage tape in a tape drive system during writing and reading processes is one of the main challenges in the area of magnetic storage tape systems. Generally, a closed loop servo system, deployed by the tape drive electromechanical system, utilizes an estimate of the head's position relative to the storage tape to align the transducer head to a data track position. Exemplary methods and systems described below gather positional information for the relative positioning of transducer elements to the magnetic storage tape by utilizing existing data structures on a magnetic storage medium and diffractive media associated with the position of the storage medium. Exemplary methods and systems described may be used without writing magnetic servo data or separate servo systems including, e.g., mechanical structures to mount an optical servo system or the like for detecting servo positioning information. With reduced mechanical structure, there may be an increase in servo actuator response, enabling higher actuator band width and finer track width resolution. Additionally, exemplary methods and systems using existing data structures and diffractive media may allow writing data tracks with reduced width and increased positioning, resulting in increased storage and reduced error rates. Those of ordinary skill in the art, however, will recognize that the exemplary methods and systems may be used to enhance or assist various other servo systems, e.g., magnetic or optical servo systems.

Exemplary tape drive systems and methods that may be used with the various exemplary systems and methods described, include, for example, those described in U.S. Pat. Nos. 6,246,535, 6,108,159, and 5,371,638, and U.S. patent application Ser. No. 09/865,215, all of which are hereby incorporated by reference as if fully set forth herein. Those of ordinary skill in the art will recognize that various other suitable tape drive systems and servo systems (perhaps with some modification that will be apparent to those of ordinary skill in the art) may also be used with one or more of the exemplary systems and methods.

The following description details exemplary magnetic servo methods and systems and exemplary optical diffraction servo methods that may be used in various combinations to provide accurate servo information to a drive system or the like. In one example, an optical diffraction servo system is used as a primary servo system with a magnetic servo sub-system providing fine adjustments to the head position.

Magnetic Servo Methods and Systems

According to one aspect, methods and systems are provided for obtaining positional information for a servo system including performing a calibration sequence during a reading/writing process from signals detected from a reference data track. For example, using read signals from a reference data track that vary in at least one aspect according to track offset, such as standard qualified signals or data integrity detection signals, positional information of a read element relative to the reference track may be estimated. The positional information may be used to more accurately determine head position relative to the magnetic tape and data tracks on the magnetic tape during reading/writing processes.

Data tracks in typical data storage devices may be qualified for possible data integrity by many detection means. For example, data integrity may be verified by detecting a characteristic associated with a read signal such as average amplitude, Phase-Locked Loop (PLL)-locked/unlocked, transition from readable data to unreadable data, k-bit, error rates, and the like (signals relating to data integrity are sometimes referred to as "track qualifiers"). In one example, determining the position of a previously written data track exploits the sensitivity of the data integrity detection signals as a function of off-track position. For example, the sensitivity of the data integrity signals change as a read element is moved across a data track. The change in response generally occurs at very specific locations away from track center and the change in response is generally repeatable and reliable. The response of the data integrity signals as a function of off-track position may thereby be determined and used for accurate position information in a servo system.

In one exemplary method, a first data track is written to a magnetic storage medium based on the ability of the drive system to maintain track position, e.g., through "open loop" control or other servo control methods available to the drive system. Subsequent data tracks are referenced from one or more existing or previously written data tracks (referred to herein as a "reference" data track). The first data track, n, becomes a reference track for the next adjacent track, n+1. As each successive data track is written a sensor, e.g., a read element, may continuously or intermittently monitor at least one previously written reference track(s) to provide relative position information. For example, if the read element and write element are fixed with respect to each other for a desired track width and spacing, a read signal indicating that the read element is drifting or offset from the reference track indicates to the servo system that the track being written is also drifting or offset from a desired position relative to the reference track. Signals that can be used to determine the tracking information include, e.g., track average amplitude, average energy of the reference track, average energy of the read gate (or "rdgate") signal, PLL-locked/unlocked, transition from readable to unreadable data, k-bit, error rate information, and other suitable read/write parametrics that change as a function of track offset as discussed above.

One exemplary servo method is described with reference to FIG. 1. In this example, at least one data track n−1 is written to storage medium 100 and aligned on storage medium 100 based on the ability of the servo system of the drive. The position of a subsequently written data track n is referenced, at least in part, by positioning one or more servo read elements 120 in a known relationship to the previously written data track n−1, e.g., aligned near a far edge of the adjacent data track n−1. Write element 105 and data read element 110 are adjusted or moved based on signals from servo read element 120 to reduce variations in the relative position of write element 105 and track n relative to track n−1. Other servo systems available to the drive system may also be used in parallel or serial fashion to provide positional information.

In one example, if track n−1 can be successfully read by servo read element 120 (e.g., within desired error rates, etc.), then track n is correctly positioned with respect to track n−1, i.e., track n is not overwriting track n−1. If track n−1 cannot be successfully read, then the head 110 is repositioned to move track n away from track n−1. When track n−1 is successfully read, write element 105 may be moved slightly closer to track n−1 to reduce spacing between track n and track n−1, which may be followed by another read to ensure that track n−1 is not being written over. The process of reading track n−1 with servo read element 120 and making adjustments of write element 105 may be performed continuously or intermittently, attempting to keep track n and n−1 to a desired width and spacing. In one example, the track width is in the range of approximately 1 μm and 44 μm, and the pitch of data tracks is in the range of approximately 1 μm and 44 μm. Track widths may vary depending on the particular application, desired storage density, error rates, and the like.

According to another example, a read element is aligned with adjacent edges of two reference data tracks to obtain positional information. A write element may be adjusted based on signals from the read head corresponding to gap phases of the two reference data tracks. For example, positional information may be acquired by monitoring the amplitude during the gap phase of two adjacent reference tracks and comparing the amplitude to the amplitude of random data.

With reference to FIG. 2A, after two data tracks n−1 and n−2 are written on magnetic storage medium 100, an active data track n is written with reference to previously written data tracks n−1 and n−2. For example, after data tracks n−1 and n−2 have been written on the storage tape, and while writing track n with write element 205, servo read element 220 straddles the border between the previous data tracks n−1 and n−2. The amplitude of the read signal from track n−1 taken during gaps 160 between data blocks 170 may be used to determine the relative position of track n compared to tracks n−1 and n−2.

For example, if the signal samples of gaps are relatively constant, servo read element 210 is positioned substantially equally over tracks n−1 and n−2. If the signal samples vary read element 210 is likely positioned unequally over one track. FIG. 2B illustrates a nominal read signal envelope of the signal from servo read element 220. When write element 205 and data read element 210 are centered on track n, and the servo read element 220 is positioned only over data, the read signal is at maximum amplitude. When the servo read element 210 is positioned over a gap 160 from either track n−1 or n−2, the read signal will be at half maximum amplitude because half of read element 210 is positioned over a gap 160.

FIG. 2C illustrates the servo read signal when servo read element 210 is positioned off-track. When write element 205 is positioned off-track and servo read element 210 is not positioned equally over track n−1 and track n−2, the servo read signal envelope contains alternating gap modulation depths because the amplitude is reduced by more than half of the maximum by gaps 160 associated with one of the tracks and by less than half of the maximum by gaps 160 associated with the other track. Write element 205 may be adjusted such that the gap modulation depth from the read signal is consistent and equal for each encountered gap 160.

The amplitude of the signals may be monitored intermittently or continuously to provide information to a servo system to keep the head in a desired position with respect to track n−1.

FIG. 3 illustrates another exemplary method, where two servo read elements 320a and 320b are aligned with and straddle adjacent edges of two reference data tracks n−1 and n−2. Write element 305 may be adjusted based on read signals from the two servo read elements 320a and 320b. The amplitude of read signals from servo read element 320a and 320b during gaps 160 indicates a magnitude and direction of the offset. The relative amplitudes of the signals from read heads 320a and 320b from gaps 160 in track n−1 and track n−2 are compared. If the ratio of the signal amplitudes is 1, then the position of the active track n, is positioned correct. If the ratio is not 1, then the head is repositioned in the appropriate direction. For example, greater amplitude for one read head indicates the direction of offset. The read signals may be sampled or measured continuously or intermittently, and used by the controller to position the write head in a desired position with respect to tracks n−1 and n−2.

Various combinations of the exemplary methods described herein are contemplated including different numbers and configurations of servo read elements. For example, a system may include a first servo read element configured to read a reference data track and a second servo read element configured to straddle two adjacent reference tracks thereby providing a first signal that varies as a function of track offset and a second signal that detects gap amplitudes indicating track offset.

According to another exemplary method and system, a read/write head halts a read/write process at a predetermined time and the head assembly is moved to locate an edge of a reference data track. The system may then register the location and boundaries (e.g., edges) of the reference data track relative to the active track and make adjustments to the position of the active track based on predetermined values or signals from the read head. The process of halting and checking the location of a reference data track may be periodically repeated as desired during writing a data track. For use in a magnetic tape drive, this example can be implemented to obtain accurate and repeatable positioning information.

With reference to FIG. 4, an exemplary method for determining relative position information during a write process is described. For a given geometry of read/write head 402, a drive servo system can read a previously written reference data track 420 and obtain information to fine adjust the position of head 402 over active track 410 (i.e., the track being accessed for either writing or reading data). In one example, the system uses data integrity read signals such as Read Channel Data Validity Resources of the tape drive and signal quality metrics of read element 406 when positioned over reference track 420. A read signal quality metric may be monitored as head 402 including reference head 406 pass over reference track 420. The relative layout of the central position and/or edges of reference track 420 with respect to the location of the active track 410 may assist the drive servo system to adjust the position of head 402 over track 410.

In one example, the Read Channel Data Validity Resources ("RCDVR") provide a relay type signal (ON/OFF), referred to as a "Data Valid" signal (FIG. 4 "Data Valid Signal"), representative of the ability of the read element 406 to recover data based on any, or combination of any, of the following data validity indicators and signals:
1. Data amplitude valid
2. Data frequency/Phase valid (phase lock loop valid)
3. Data Block's Pre-amble/Post-amble amplitude and or phase/frequency and or sync signal valid
4. Data pattern Valid
5. Data Block's Pre-amble/Post-amble pattern valid The lower portion of FIG. 4 illustrates an exemplary read signal received from head 402 that may determine the relative position of head 402 during operation. As the read element 406 of head 402 moves across the reference track 420, the data valid signal changes its state from "Off" near the edge of reference track 420 where data is not valid to "ON" where the data become valid and back to OFF where the read element crosses the opposite edge of reference track 420. To check the track layout dimensions and to position read element 406 over reference track 420, the servo system may halt the read/write function over the active track 410 at specified time period (Track Layout Check period: Ts as shown in FIG. 4) and initiate a seek to and over the edges of reference track 420. By monitoring the state of the data valid signal and instantaneous relative position of head 402 with respect to the active track 410 location provided by the servo position-sensing device, the servo system registers the location and boundaries of reference track 420 relative to active track 410. This registered value referred to as "Reference Position" is compared to a nominal value. If there is no difference then track layout is correct and the servo system may initiate another seek back to active track 410 to resume read/write functions with no further action until the next Track Layout Check time Ts. If there is a difference between the measured reference position and its nominal value, however, indicating a change in track layout or change in relative position of tape 400 and head 402, then the servo system will initiate another seek back to active track 410 and modify the reference position of the servo positioning loop to correct the track layout back to the nominal dimensions. The system then resumes read/write functions until the next Track Layout Check time Ts.

Since data is not retrieved from or written to active track 410 during a data track layout check in this particular example, periodic gaps without data are created within the data pattern, the length and duration of the gaps ("Tg") are determined by the duration of motion to and from the reference track ("Tm") and the time to accurately resolve the Data Valid information from the reference track ("Td"). The frequency rate of these gaps (Fs=1/Ts) determines correction bandwidth capability of this method and also the overhead to tape capacity. Generally, a higher frequency rate of track layout checks allows for faster correction, but reduces data capacity of the storage medium.

Those of ordinary skill in the art will recognize that the exemplary methods may be carried out alone or in any combination of firmware, software, and hardware associated with a drive system.

According to another exemplary method, the read/write process is halted and a dedicated read head is moved to locate an edge of a reference data track during a read/write process of an active track. The system may register the location and boundaries of the reference data track relative to the active track and make adjustments to the position of the active track based on predetermined values or signals from the read head as described above. The process of halting and checking the location of a reference data track may be periodically repeated as desired during writing a data track.

Figure 5:
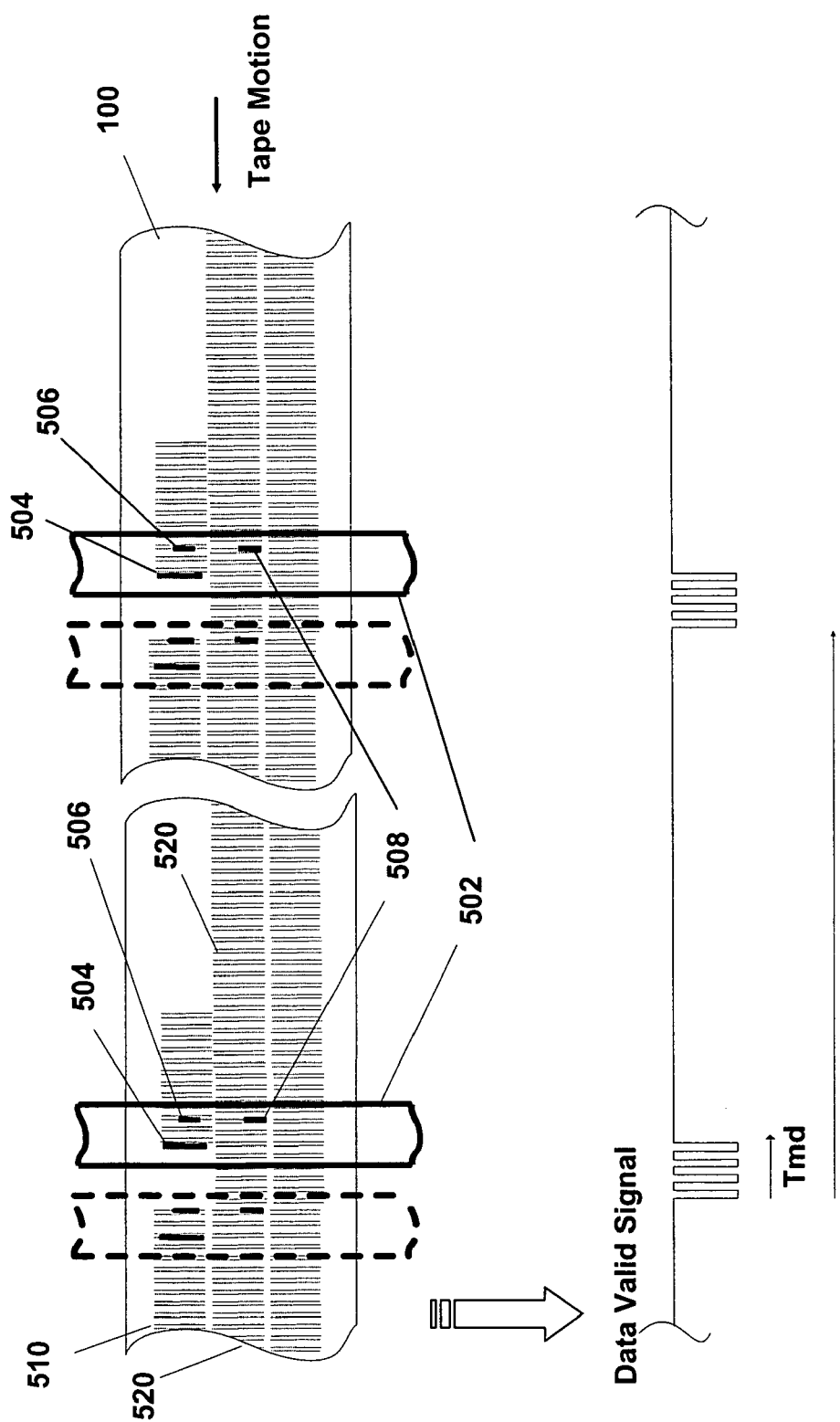
FIG. 5 illustrates another exemplary magnetic head assembly relative to a magnetic tape and associated signals generated during a servo process.

The example of FIG. 5 is similar to the example of FIG. 4 except that a dedicated servo read element 508 is included with head assembly 502. Servo read element is positioned adjacent an edge of reference track 520 and therefore requires less movement of head 502 and time to reference one or more edges and/or the center position of reference track 520. In one example, the method and system uses RCDVR signals from dedicated servo read element 508 to determine the location of the active read element 506 and write element 504 with respect to the edge of reference track 520. The positional information is then used to assist the servo system to adjust the read element 506 and write element 504 over active track 510.

According to another exemplary method, a dedicated read head provides a continuous read signal associated with the relative position of a reference data track with the location of the active track. The servo system may use the position information to adjust the position of the write head to a desired relative position with the reference data track.

Figure 6:
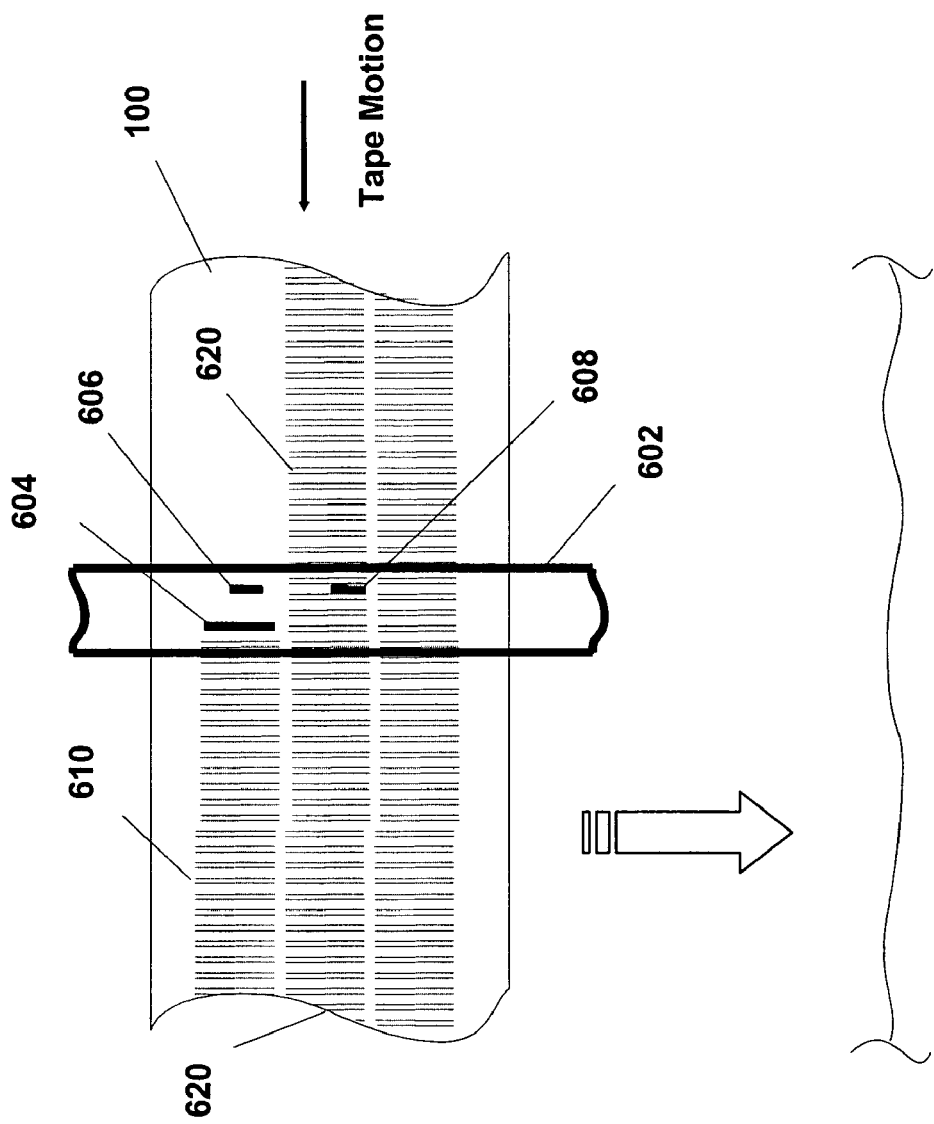
FIG. 6 illustrates another exemplary magnetic head assembly relative to a magnetic tape and associated signals generated during a servo process.

The example of FIG. 6 is similar to the example of FIG. 5 except that dedicated servo read element 608 provides a continuous signal associated with the position of servo read element 608 relative to reference track 620. Accordingly, in this example, the servo system may make continuous position determinations and continuous adjustments to the position of head 602.

As the read element 608 moves across the edge of the reference track 620, the read signal (or data valid signal) provides a linear signal proportional to the relative position of servo read element 608 to the edge of reference track 620. The read signal is used as a feed back positioning signal to enforce the tracking of the edge of reference track 620 by the servo read element 608. The design of head 602 is such that, when servo read element 608 tracks the edge of reference track 620 the active read element 606 and write element 604 are positioned over active track 610. Accordingly, the exemplary method supplies the servo system with a servo read signal for positioning head 602 over desired track positions, laid out alongside and parallel to a previously written or reference track.

EXAMPLE

In one example of the above method, firmware was written for a SDLT220 tape drive manufactured by Quantum Corporation. The firmware utilized the optical tracking servo system of the SDLT220 with "assistance" from reading the edge of an adjacent reference track. A Read Gate signal is generated by the SDLT220 read channel that indicates whether the read channel has read a good block of data. If the Read Gate signal is greater than a predetermined value, then the data block was good. Conversely, if the Read Gate signal is below the predetermined value, then the data block was bad.

Several data tracks were written in standard SDLT220 mode. The data tracks were then read. After the SDLT220 optical servo locked the head onto the center of a data track, the Read Gate signal was sampled by the servo system at a frequency of 10 KHz for 7.5 milliseconds. If the majority of the samples were good, then an offset was added to the current optical servo position to move the head farther from the center of the Active Track. If the majority of the samples were bad, then an offset was added to the current optical servo position to move the head closer to the center of the Active Track. This procedure of sampling the Read Gate signal and then adding or subtracting an offset to the current optical servo position was repeated continuously along the length of tape. The head gradually moved to the edge of the Active Track and continued to follow the edge of the Active Track along the length of the tape.

A subsequent test was performed where several data tracks were written using standard SDLT220 optical servo system, but a 10 Hz sinusoidal frequency was injected into the optical servo signal path, causing the servo to write the data tracks with a 10 Hz sinusoidal deviation from the nominal position. When the data tracks were then read using the method described above, the head followed the 10 Hz signal that was injected during the write process.

Various exemplary transducer heads that may be used with one or more of the above described methods and systems. One exemplary head design includes a center tapped head having two read elements where one read element includes a dedicated read element positioned to derive servo positioning information from an adjacent data track. For example, a first read element reads data on the currently active desired track while a second read head provides servo position information from the adjacent reference data track.

Figure 7:
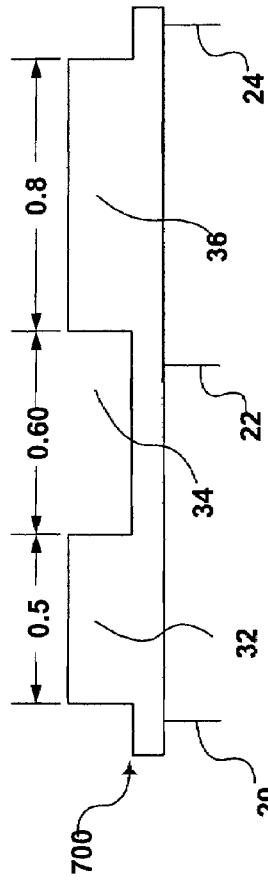
FIGS. 7–11 illustrate exemplary magnetic head geometries.

FIG. 7 illustrates an exemplary center tapped head 700 with two effective read elements 32 and 36. In operation, read element 32 is configured to be positioned on the center of an active track and is approximately 0.50 track widths. Read element 36 is approximately 0.8 track widths and separated 0.60 track widths away from read element 32 by recess 34. Read element 36 is configured to be positioned on the reference track center. The dimensions of the second read head 36, in this example 0.8 track widths, are at the limits of track qualifiers, which are used for fine track positioning. The portion of head 700 including read elements 32 and 36 includes one magneto-resistive strip. The electrical connections of head 700 are such that the data read element lead 20, and the servo read element lead 24, are independent from the common lead 22.

Figure 8:
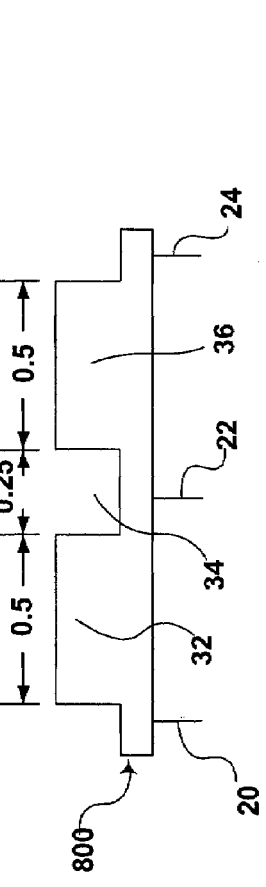

FIG. 8 illustrates an exemplary head 800. In this example, head 800 is center tapped with two read elements 32 and 36, where read element 32 is 0.5 track widths and positioned at the center of the active track, and read element 36 is also 0.5 track widths and separated 0.25 track widths away from read element 32 by recess 34. In this configuration, read element 36 may be aligned with the reference track edge and sense track qualifiers or the like to provide positioning information for the servo system.

Figure 9:
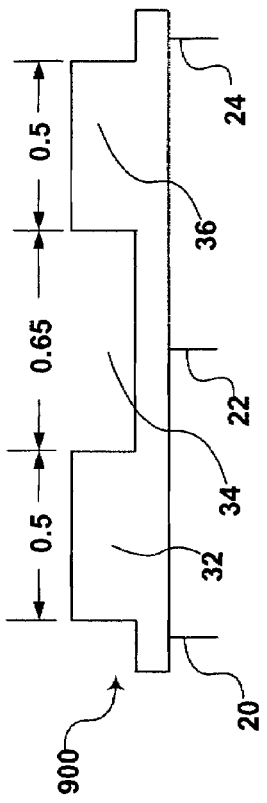

FIG. 9 illustrates an exemplary head 900. In this example, head 900 is center tapped with two read elements 32 and 36. The configuration of head 900 is similar to FIG. 8, except that recess 34 is 0.65 track widths such that read element 36 is configured to be aligned with the opposite edge of a reference track.

Figure 10:
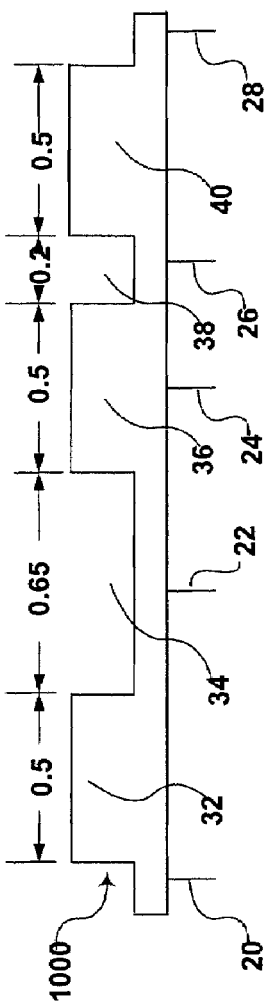

FIG. 10 illustrates an exemplary head 1000 with multiple taps and multiple read elements. Head 1000 includes three read elements 32, 36, and 40 separated by recesses 34 and 38. The first read element 32 is for reading the active track and is positioned nominally at track center. The second read element 36 is positioned near a reference track edge, e.g., on the edge of track n−1 near edge n−2. The third read element 40 is positioned on a second reference track, e.g., on the edge of track n−2 near n−1. Head 1000 may be used is a push-pull configuration with two read elements sensing servo qualifiers from the track edge at the n−1 and n−2 boundary. Head 1000 further includes common lead 22 and read element lead 26.

Figure 11:
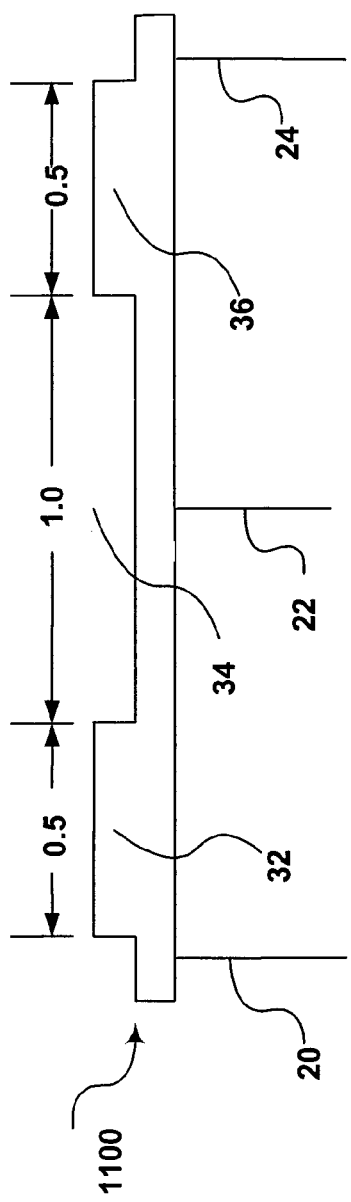

FIG. 11 illustrates another exemplary head 1100. The data read element 32, having a width of 0.5 track widths is positioned 1.5 track widths away from the center of servo read head 36. The separation formed by recess 34 between the read element 32 and read element 36 is 1.0 track width. The exemplary head 1100 may form one magneto-resistive strip of a multi-head channel as described below.

Figure 12:
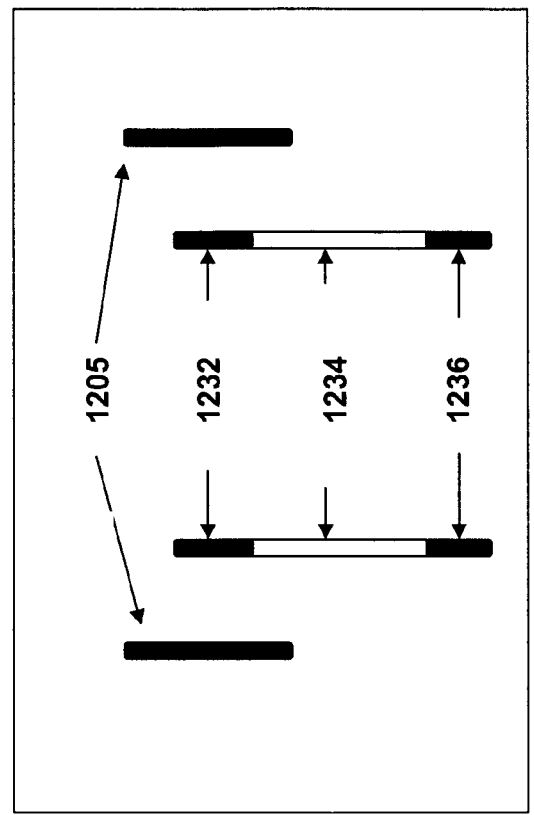
FIG. 12 illustrates one channel of an exemplary read-write multi-channel head.

FIG. 12 illustrates the relative geometry of a typical read-write multi-channel head using the center tapped data and servo read element. In particular, write elements 1205 are shown in relation to data read elements 1232 and servo read elements 1236 for one channel.

Optical Servo Systems and Methods

The following includes several optical servo systems advantageously used in conjunction with the above magnetic servo methods and systems using existing data structures. For example, a system may include primary and subservo systems, where an optical servo system described herein provides primary servoing and a subservo system based on previously written data structures provides fine adjustments.

According to one exemplary optical servo method provided herein, the position of a first diffractive medium relative to a second diffractive medium is determined, where the first diffractive medium is associated with the magnetic storage medium. At least one light source (e.g., a coherent source such as a laser) illuminates the first diffractive medium to produce a first diffractive pattern. The first diffractive pattern illuminates the second diffractive medium to produce an output diffraction pattern. At least one detector detects the output pattern. A controller determines a relative position of the first diffractive medium to the second diffractive medium based on the detected output pattern. The controller may determine the relative position of the first diffractive medium to the second diffractive medium in a first (e.g., lateral) direction based upon the detected output pattern (e.g., the total intensity of the detected output pattern).

The exemplary method may be applied to any measurement or positioning system using a material that can be patterned to allow light transmission. The material is fabricated with the pattern attached to or made part of the object to be measured. The resulting diffractive medium may be referred to as an "object mask." A second diffractive medium or "reference mask" may comprise an identical or similar pattern.

The first and second diffractive media may comprise a first and second mask having respective first and second mask patterns. The mask patterns may each comprise a grid of transmissive dots, oblong holes, or similar marks, for example. The mask patterns may be identical. In another example, one mask pattern may comprise an integer multiple number of rows of marks for every row in the other mask pattern, wherein a row lies in a plane of the mask in a longitudinal direction perpendicular to the lateral direction. In another example, the pattern of the first and/or second mask may comprise lines lying in the longitudinal direction.

The at least one detector may include first and second detectors, wherein the second detector is spatially displaced in the lateral direction with respect to the first detector so as to detect the output pattern in a manner offset by 90 degrees from the first detector. For example, if the first detector is laterally aligned with a row of voids, the second detector may be laterally displaced to detect half of the light from the voids. In another embodiment, the first and second detectors may be only partially orthogonally displaced from each other, such as by 120 degrees, for example, which would still include the orthogonal component. By virtue of this orthogonality, the controller may also determine the direction of motion of the second diffractive medium relative to first diffractive medium.

The servo system described herein may be employed in a tape drive to servo a recording head with respect to a recording tape. In such a tape servo system, the first diffractive medium may comprise the recording tape. The recording tape may act as a first mask having servo tracks or other markings as a first mask pattern. A second mask may be mechanically coupled to the recording head. The controller controls the lateral position of the head through a head actuator. The controller determines the relative position of the head to the tape, thereby allowing the controller to adjust the head position to achieve a desired position with respect to the tape.

One advantage of employing interference masks (e.g., with the reference mask mounted to a recording head) is that it does not require a moving optical sensor, thereby simplifying the optical system for tapes and reducing the actuator mass (increasing mechanical responsiveness). Also, this example allows the use of very opaque transmissive media and interference amplification and light aggregation with self-aligning patterns.

Figure 14:
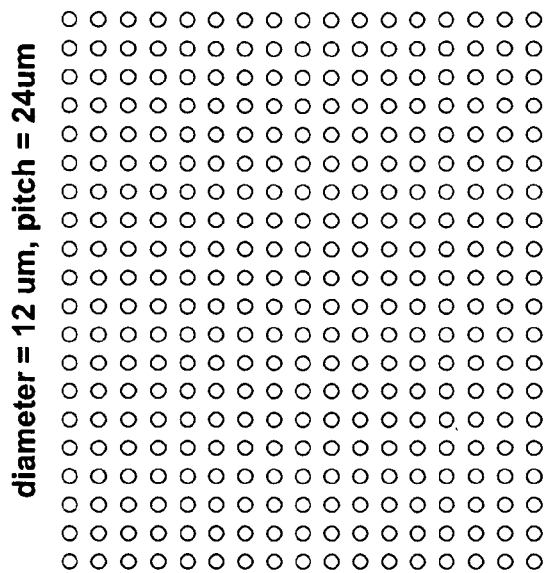
FIG. 14 illustrates an exemplary pattern of an object and/or reference mask.
Figure 13:
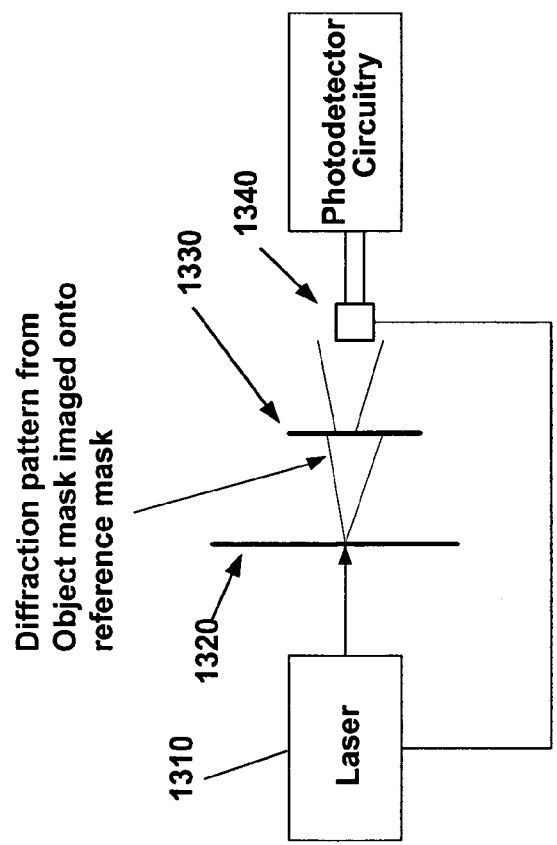
FIG. 13 illustrates an exemplary optical servo system.

FIG. 13 illustrates an exemplary optical servo system according to one example. This example is described and shown for detecting object motion in one dimension, however, those skilled in the art will recognize that the techniques described herein may be expanded to multiple dimensions. In this example, the motion of interest is in the vertical direction (i.e., lateral direction perpendicular to the longitudinal direction of the tape transport). Two masks are used, an object mask 1320 associated with a storage medium and a reference mask 1330, as shown in FIG. 13. In one example, object mask 1320 is attached or included with the object, e.g., storage tape, and the reference mask 1330 is held in a stationary position. A light source 1310, such as a coherent laser source, illuminates object mask 1320 and reference mask 1330. A sensor 1340, e.g., a CMOS or CCD photodetector array, is used to measure the light energy that passes through object mask 1320 and reference mask 1330. The light source 1310, sensor 1340, and reference mask 1330 are mechanically fixed relative to the object and associated object mask 1320. The mask patterns may include, for example, a circular grid pattern, as shown in FIG. 14, or a line pattern, as shown in FIG. 15. The dimensions of the mask pattern relate to the measurement resolution, e.g., generally, smaller dimensions of the mask pattern marks result in finer measurement resolution. In one example, the diameter of the marks, e.g., as shown in FIG. 14, is 12 µm and the pitch is 24 µm. Those of ordinary skill in the art will recognize that various other mask patterns are possible.

Sensor 1340 measures the total diffracted light energy that passes through both object mask 1320 and reference mask 1330, which contains information concerning both the position of object mask 1320 and reference mask 1330. For example, maximum intensity of the detected light occurs when the pattern of object mask 1320 is aligned to the pattern of reference mask 1330. As the object mask 1320 is moved vertically (laterally) there is an increasing, then decreasing, intensity change corresponding to each row crossing of the object mask 1320 diffracted pattern with the reference mask 1330 pattern. Provided the object mask 1320 and reference mask 1330 patterns are properly aligned, maximum light intensity occurs when there is an object mask 1320 row coincident with a reference mask 1330 row. The maximum intensity row crossing occurs when the object mask 1320 pattern is directly over the reference mask 1330 pattern.

Quadrature waveforms, e.g., sine and cosine waveforms, can be used to keep row count and direction. For example, by using two sensor systems, offset in phase by 90 degrees, sine and cosine signals may be produced.

Further enhancements to this system will be recognized by those of ordinary skill in the art. For example, imaging optics placed between object mask 1320 and reference mask 1330 may optimize the object mask diffraction pattern imaged onto the reference mask 1330. Light collimation and light collecting lenses can also be used to improve the amount of light collected by sensor 1340.

According to another exemplary method and system, a tape drive detects servo information by employing a double mask interference technique as described above and includes a mask pattern attached to a recording head of the system. A servo pattern disposed on the magnetic tape provides the second diffractive mask pattern. In one example, the magnetic tape may be that used by the SDLT drive manufactured by Quantum Corporation or any other suitable storage tape, and the optical diffraction servo system may be used with current SDLT LTM reduction systems. The exemplary methods and systems provide a measure of head motion relative to the tape mask position.

In one example, the reference mask pattern may be designed to allow maximum light transmission. The mask material is fabricated with an optical pattern and attached to or made part of the head assembly. The mask pattern diffraction interference produces an amplified pattern that is used to detect and, ultimately, control the tape motion, and position, of the object mask relative to the reference mask. This example may reduce or eliminate the need for reflective optical sensors in conventional tape drive systems without requiring modification of the tape media. Additionally, compared to existing reflective optical servo systems, this example may also simplify the optical system by removing the optical sensor from the head actuator, thereby reducing actuator mass and increasing mechanical responsiveness.

Figure 17:
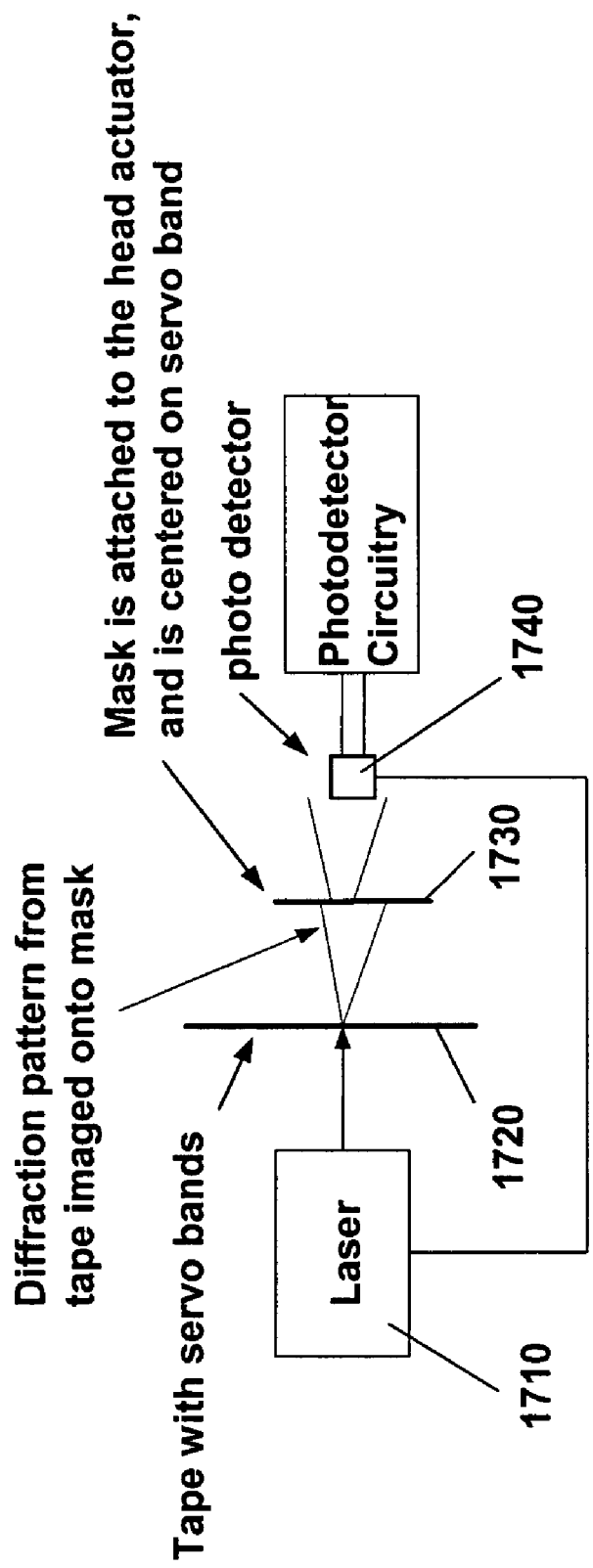
FIG. 17 illustrates an exemplary optical servo system.

Referring to FIG. 17, an exemplary optical servo system using a magnetic tape servo pattern and a mask pattern attached to the head actuator to detect head motion is described. The magnetic tape servo pattern and the mask pattern geometry may be similar to that shown in FIG. 14. Operation of the method is similar to that described with reference to FIG. 13. A light source 1710, e.g., a laser of coherent light, illuminates and transmits through a servo pattern attached to or made part of the magnetic tape 1720, thereby creating a diffraction pattern similar to that shown in FIG. 16. The diffraction pattern is then imaged onto a reference mask or actuator mask 1730 coupled to or part of a recording head. The total light energy passing through the actuator mask 1730 is the sum of the light passing through the servo pattern of tape 1720 and actuator mask 1730. A sensor 1740, e.g., a CMOS or CCD photodetector array, measures the total diffracted light energy that passes through actuator mask 1730, which contains information concerning both the tape position and the actuator position.

Figure 18:
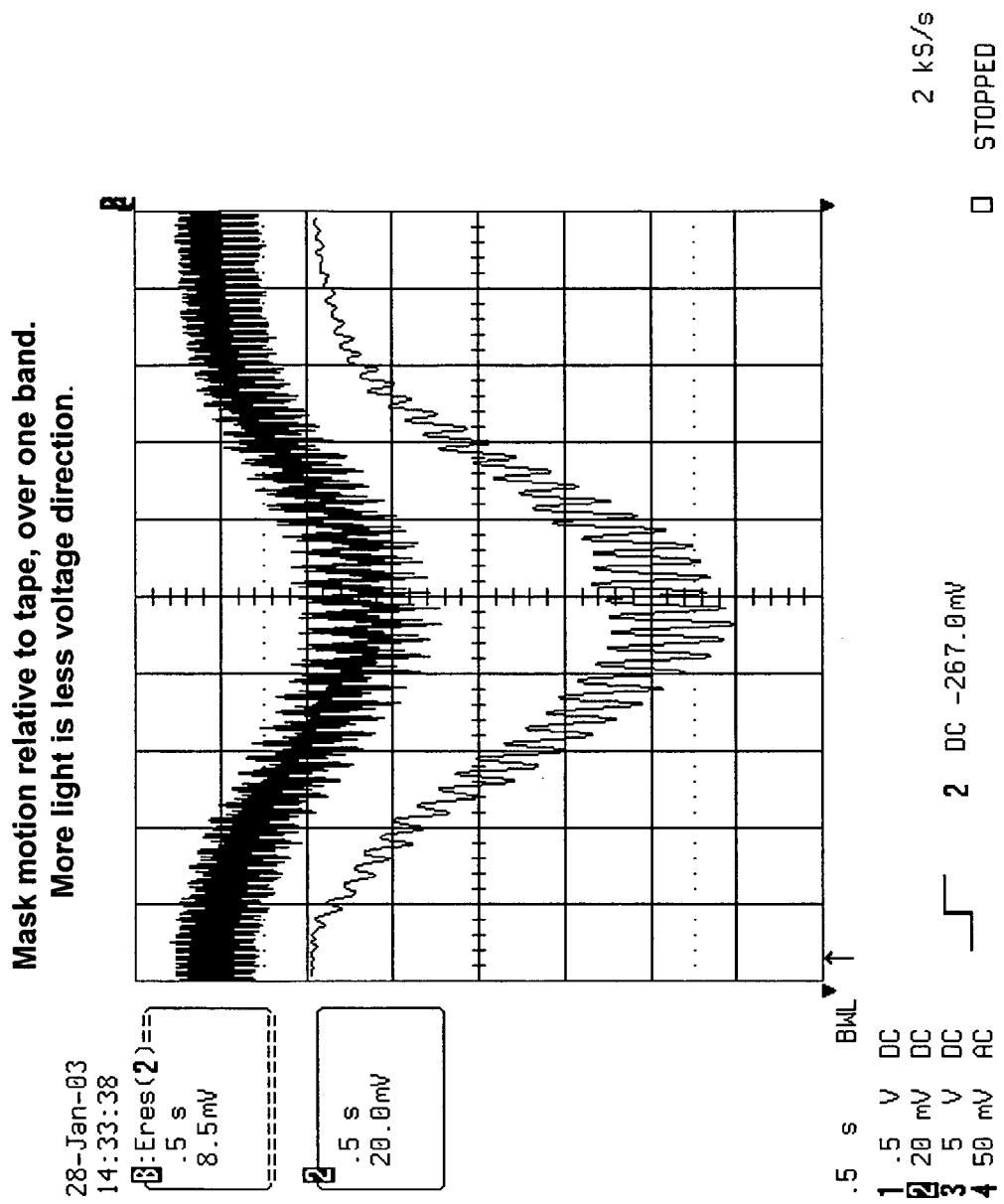
FIG. 18 illustrates exemplary signals detected by an optical sensor in an optical servo system.

When light transmits through the tape 1720 servo pattern, a diffraction pattern is projected and imaged onto the mask 1730. Movement of mask 1740 or light source 1710 does not shift the diffraction pattern; however, there is an intensity change, as measured by sensor 1740, when the tape 1720 servo pattern moves laterally. The diffraction pattern created by the light source 1710 transmitting through the servo pattern interferes with the diffraction pattern created by this light as it transmits through the actuator mask 1730 pattern. Maximum intensity occurs when the servo pattern of tape 1720 is centered on the mask 1730 pattern, as shown in FIG. 18. As the mask 1730 is moved laterally there are two effects observed: a slowly increasing, then decreasing, intensity change; and a faster sinusoidal intensity change corresponding to each track crossing of the tape diffracted pattern with the mask pattern.

Figure 20:
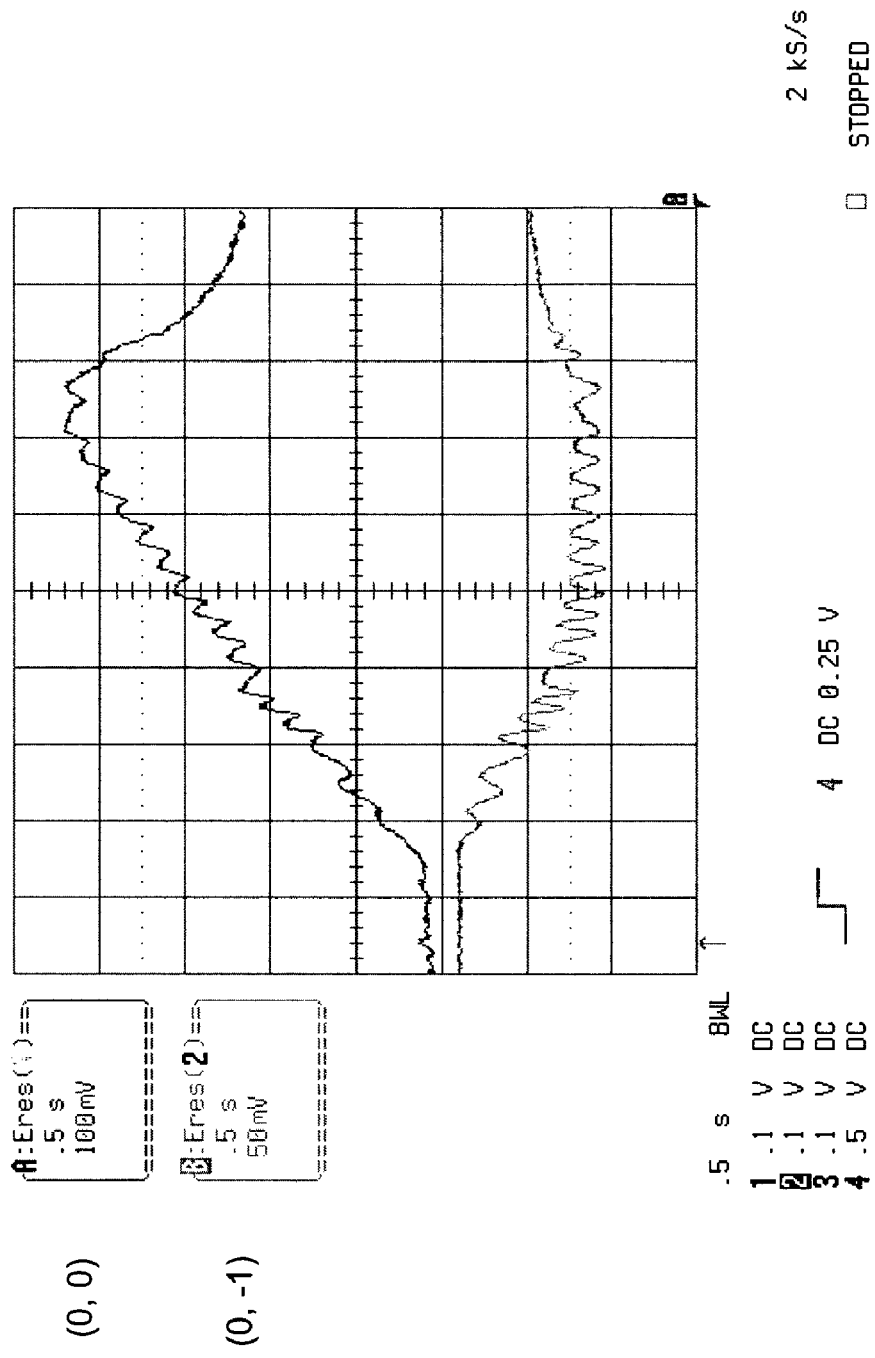
FIG. 20 illustrates exemplary signals detected by an optical sensor in an optical servo system.

Provided mask 1730 and tape 1720 servo patterns are properly aligned, there will be only one maximum light intensity track crossing at the band center, specifically at track 9 (assuming 17 tracks in a servo band). This maximum intensity track crossing occurs when the tape servo pattern is directly over the mask pattern. This easily detectable signal is the reference point from which tracks can be counted. There will be 8 tracks above this point and 8 tracks below this point, resulting in the 17 tracks of the servo band. The oscilloscope trace of FIG. 20 shows the signal obtained when the entire 17 tracks of the mask move transversely over the magnetic tape diffraction pattern.

Two servo signals are advantageously used for counting tracks and to determine direction. Quadrature waveforms, e.g., sine and cosine waveforms, can be used to keep track count and direction. For example, using two patterns offset in phase by 90 degrees produces sine and cosine signals. In this example, assuming a track pitch of 0.00100 inch, the relative transverse mask displacement will be 0.00025 inch. Using two masks with two photodetectors placed in quadrature will provide sine and cosine signals whose count will determine track number, with the difference determining direction. Additionally, various imaging optics placed between the mask and the tape may optimize the tape diffraction pattern imaged onto the mask as will be recognized by those of ordinary skill in the art.

In another example, the mask 1730 may be incorporated into a glass tape head island in contact with tape 1720 to smooth out any minor tape edge anomalies. The mask can be placed onto the glass by etching away a deposited metal layer, or by direct bonding of photographic mask, for example. The glass island may be placed near the recording head.

The above observations describe how the mask position sensor works with a static magnetic tape. With the magnetic tape in motion, there is another component to the detected signals. The tape servo mark motion acts as a carrier and the tape lateral motion modulates this carrier. As will be apparent to those skilled in the art, subsequent signal processing techniques may be employed to detect the amount of modulation corresponding to the amount of lateral tape motion.

This method (and others described herein) enables optical transmission through standard recording tape, which is practically opaque. The light is amplified orders of magnitude through a matching selection of mask, wavelength and interference "nth" order aggregation/detection. The resultant optical system demonstrates the feasibility of a reduced actuator mass by moving the laser and detectors off of the actuator. In one example, the mask is the only element attached to the actuator. The actuator mass reduction increases servo response compared to prior art optical servoing techniques. This method and system are also more tolerant of missing or deformed servo marks, since the method and system integrate many servo marks simultaneously to produce position information.

According to another example, the edge of the magnetic tape creates a diffraction pattern that is imaged onto a mask. The resulting interference pattern contains direction and relative motion information that is detected with a suitable sensor and used for servo positioning a head actuator. Thus, in one exemplary optical servo method and system, a first diffractive medium includes an edge of the recording tape. The geometry of the servo system (e.g., the distance between the tape edge and the second diffractive medium and the distance between the second diffractive medium and the at least one detector) can be adjusted to control the phase difference between two orders of fringes in the output pattern (e.g., the (0,0) and (0,−1) orders). For example, the phase difference can be set to 90 degrees, or to a partially orthogonal value such as 120 degrees. A first detector may detect one order and a second detector may detect the other order. By virtue of detection of these quadrature signals, the controller is provided with information concerning the direction of motion of the second diffractive medium with respect to the tape edge.

Figure 19:
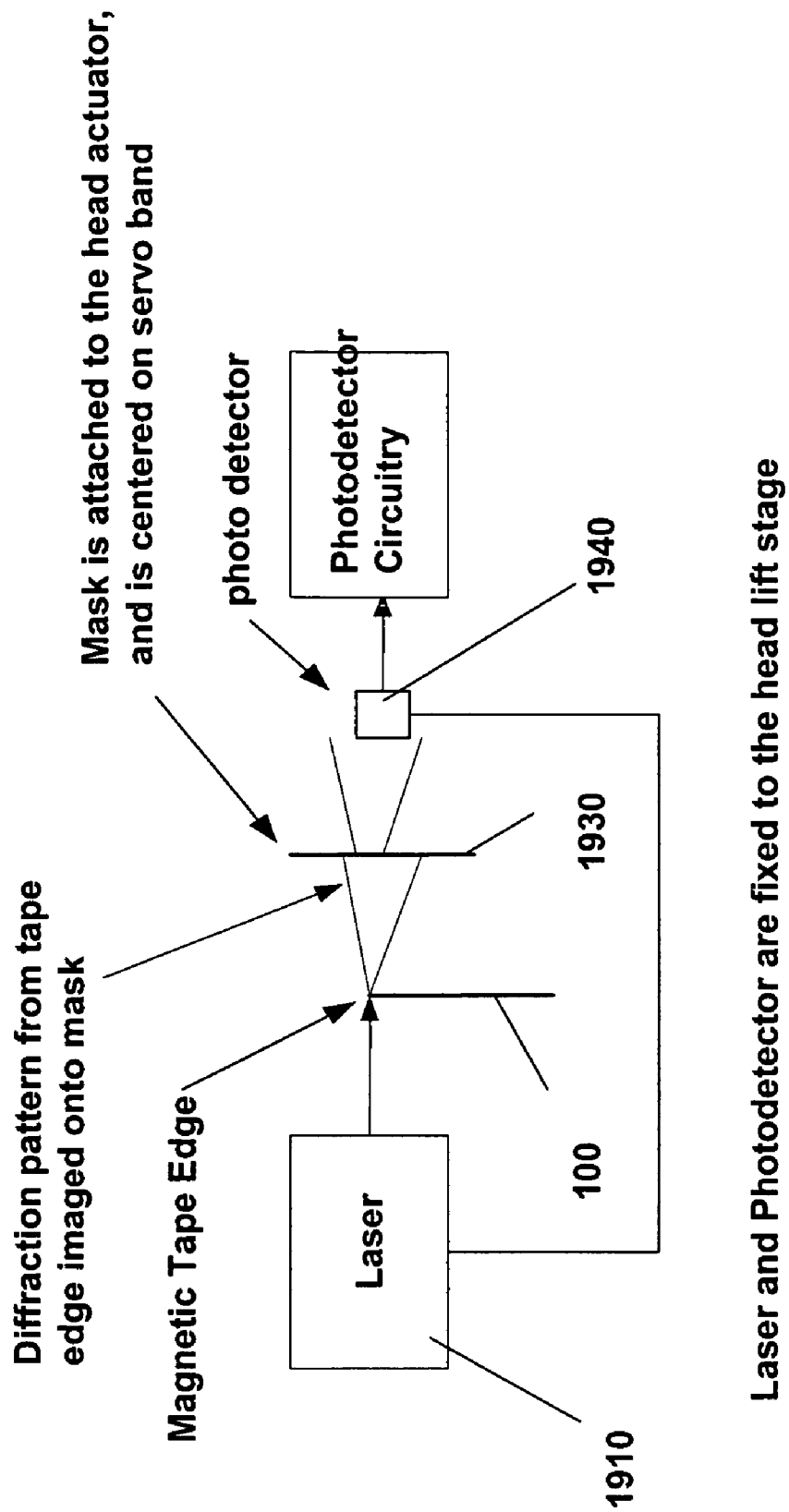
FIG. 19 illustrates an exemplary optical servo system.

FIG. 19 illustrates an exemplary optical servo system where an optical source 1910 illuminates an edge of a storage tape 100 to create a diffraction pattern to provide servo information. Operation of the exemplary servo system may be described by following the light path from left to right in FIG. 19. Light source 1910, e.g., a laser, provides illumination that diffracts over tape edge 100, creating a diffraction pattern, which is imaged onto and passes through mask 1930 creating an output mask diffraction pattern. The output diffraction pattern is detected by sensor 1940 and may be processed to provide relative positional information of tape 100 within the system.

In one example, light source 1910 includes a coherent light source, e.g., a laser diode or the like. Sensor 1940 may include any suitable optical sensor array or line scanner such as a CCD or CMOS device. Light source 1910, sensor 1940, and mask 1930 may be mechanically fixed in a known physical relationship relative to tape 100 and a head actuator (not shown).

In one example, mask pattern 1930 includes four bands of optical marks (e.g., holes or transmissive portions), one of which is illustrates in FIG. 14. In one example, the mask includes a hole pattern having a pitch of 24 µm and a diameter of 12 µm. It will be recognized that various other dimensions and mask patterns may be used, e.g., another mask pattern that may be used includes lines in the longitudinal direction with suitable spacing and dimensions to provide direction and relative motion information. The pattern on mask 1930 may be one dimensional, comprising elements such as lines with suitable width and spacing, or a grating line pattern for increased light transmission. Additionally, a mask may include a pattern of varying transmissive materials to the light source.

When light diffracts over the edge of tape 100 and a diffraction pattern is projected and imaged onto the actuator mask 1930, movement of mask 1930 or light source 1910 does not shift the diffraction pattern; rather, the movement creates an intensity change in the diffraction pattern, as measured by sensor(s) 1940. Maximum intensity occurs when the tape edge diffraction pattern covers or matches the actuator mask 1930 pattern. As mask 1930 is moved laterally with respect to the edge of tape 100 two effects are observed: a slowly increasing intensity change; and a faster sinusoidal intensity change corresponding to each track crossing of the tape edge diffracted pattern with the actuator mask diffraction pattern.

From the output mask diffraction pattern, two of the orders (0, 0) and (0, −1) provide light levels that are out of phase with each other as a function of tape 100 or mask 1930 lateral motion. The geometry of the system, e.g., the distance from the edge of tape 100 to mask 1930, and the distance from mask 1930 to sensor 1940, may be adjusted to provide varying amounts of phase difference between the two orders (0, 0) and (0, −1). In one example, the phase difference of the servo system is 90 degrees out of phase, e.g., as is the case with sine and cosine waveforms. Using two waveforms that are 90 degrees out of phase it will be recognized that both relative position and direction of motion of tape 100 to the transducer head may be derived. In one example, two photodetectors, one for each order of the diffraction pattern, allow the signals to be detected simultaneously. FIG. 20 illustrates scope traces displaying two orders in one example.

Provided mask 1930 and the edge of tape 100 are properly aligned, there will be a single maximum light intensity track crossing. This maximum intensity track crossing occurs when the tape edge diffraction pattern is matched over the mask pattern. This signal is the reference point from which tracks can be determined. In the exemplary scope trace shown in FIG. 20, the maximum intensity track occurs on track 17.

It should be recognized by those of ordinary skill in the art that the exemplary servo methods for sensing the position of a tape edge are illustrative only and various modifications (including additions and subtractions of devices or actions) to the above methods and systems are possible. Additionally, various methods and systems may be used in combination with other optical tape edge servo methods and systems.

The above detailed description is provided to illustrate exemplary embodiments and is not intended to be limiting. It will be apparent to those of ordinary skill in the art that numerous modification and variations within the scope of the present invention are possible. For example, various exemplary methods and systems described herein may be used alone or in combination with various other positional and/or servo methods and systems whether described herein or otherwise including, e.g., optical or magnetic servo methods and systems. Additionally, particular examples have been discussed and how these examples are thought to address certain disadvantages in related art. This discussion is not meant, however, to restrict the various examples to methods and/or systems that actually address or solve the disadvantages.

Finally, please note that in those instances, if any, where the same reference numeral or letter in the text refers to different elements in different figures, please refer to the figure being locally discussed in the text as the proper context to associate the reference numeral or letter with the correct element as would be logically apparent to those skilled in the art.

The invention claimed is:

1. A method for detecting the position of a transducer head with respect to a storage medium, comprising:
generating a read signal from a read element associated with a transducer head, the read signal generated in response to a reference data track stored on a magnetic storage medium;
determining a relative position of a first diffractive medium with respect to a second diffractive medium, wherein the first diffractive medium is associated with the storage medium; and
repositioning the transducer head relative to the storage medium in response to the read signal and the relative position of the first diffractive medium with respect to the second diffractive medium.

2. The method of claim 1, wherein a characteristic of the read signal varies as a function of offset between the reference track and the read element.

3. The method of claim 2, wherein the characteristic includes one or more of error signal values, noise signals, average amplitude, average energy, k-bit values, and error rate values.

4. The method of claim 1, wherein the read signal includes a signal quality parametric that varies as a function of offset between the read element and the reference data track and the transducer head is repositioned based on the signal quality parametric.

5. The method of claim 1, wherein the reference data track includes a previously written data track.

6. The method of claim 1, wherein the read element is a dedicated servo read element configured to read a reference data track as the transducer head access an active data track.

7. The method of claim 1, further comprising writing a data track adjacent the reference data track.

8. The method of claim 1, further comprising illuminating the first diffractive medium and the second diffractive medium with a light source, and detecting light passing through both the first diffractive medium and the second diffractive medium.

9. The method of claim 8, further comprising determining the relative position of the first diffractive medium and the second diffractive medium based on an output pattern of the light passing through the first diffractive medium and the second diffractive medium.

10. The method of claim 1, wherein the first diffractive medium is included with the magnetic storage medium.

11. The method of claim 1, wherein the first diffractive medium includes an edge of the magnetic storage medium.

12. The method of claim 1, wherein the second diffractive medium is mechanically coupled with the transducer head.

13. The method of claim 1, wherein at least one of the first diffractive medium and the second diffractive medium include a grid of optical marks.

14. The method of claim 1, wherein at least one of the first diffractive medium and the second diffractive medium include a row of optical marks.

15. The method of claim 1, further comprising repositioning the transducer head relative to the storage medium in response to a detected diffraction pattern produced by illuminating the first diffractive medium and the second diffractive medium.

16. A head positioning servo system, comprising:
a transducer head assembly including a magnetic read element;
a diffractive medium spatially fixed with respect to the transducer head assembly;
a light source for illuminating at least a portion of a magnetic storage medium and the diffractive medium;
a detector for detecting light from the light source illuminating the magnetic storage medium and the diffractive medium; and
a controller configured to adjust the position of the transducer head in response to the detected light and a read signal from the read element associated with a reference data track stored on the magnetic storage medium.

17. The system of claim 16, wherein the read element is in a spatially fixed relationship to a write element such that alignment of the read element with at least a portion of the reference data track aligns the write element adjacent the reference data track.

18. The system of claim 16, wherein a characteristic of the read signal varies as a function of offset between the reference track and the read element.

19. The system of claim 17, wherein the characteristic includes one or more of error signal values, noise signal values, average amplitude, average energy, k-bit values, and error rate values.

20. The system of claim 16, wherein the read signal includes a signal quality parametric that varies as a function of offset between the read element and the reference data track.

21. The system of claim 16, wherein the controller determines the relative position of the transducer head assembly based on an output pattern of the light illuminating at least a portion of the magnetic storage tape and passing through the diffractive medium.

22. The system of claim 16, wherein the magnetic storage medium includes a second diffractive medium.

23. The system of claim 16, wherein the light source is configured to illuminate an edge of the magnetic storage medium to create a diffraction pattern imaged onto the diffractive medium.

24. The system of claim 16, wherein the diffractive medium includes a grid of optical marks.

25. The system of claim 16, wherein the diffractive medium includes a row of optical marks.

26. The system of claim 16, wherein the diffractive medium is included with a glass tape head island configured to be in contact with a magnetic storage medium.

27. The system of claim 16, wherein the detector includes a first detector and a second detector displaced laterally across the tape width.

28. The system of claim 16, wherein the controller is further configured for adjusting the transducer head in response to a detected diffraction pattern from the light illuminating the magnetic storage medium and the diffractive medium.

* * * * *